United States Patent [19]

Biffle

[11] 4,208,056

[45] Jun. 17, 1980

[54] ROTATING BLOWOUT PREVENTOR WITH INDEX KELLY DRIVE BUSHING AND STRIPPER RUBBER

[76] Inventor: Morris S. Biffle, 800 W. Front, Midland, Tex. 79701

[21] Appl. No.: 38,329

[22] Filed: May 11, 1979

Related U.S. Application Data

[63] Continuation-in-part of Ser. No. 843,291, Oct. 18, 1977, Pat. No. 4,154,448.

[51] Int. Cl.² .................. F16J 15/56; F21B 33/03
[52] U.S. Cl. ............................. 277/31; 277/2; 251/1 B
[58] Field of Search ............... 277/1, 2, 20, 30, 31; 251/1 R, 1 B

[56] References Cited

U.S. PATENT DOCUMENTS

| | | | |
|---|---|---|---|
| 2,176,355 | 10/1939 | Otis | 277/31 |
| 2,846,178 | 8/1958 | Minor | 251/1 B |
| 2,853,274 | 9/1958 | Collins | 277/31 X |
| 2,904,357 | 9/1959 | Knox | 277/31 |
| 3,225,831 | 12/1965 | Knox | 251/1 B X |
| 3,387,851 | 6/1968 | Cugini | 277/31 X |
| 3,667,721 | 6/1972 | Vujasinovic | 251/1 B |
| 3,915,425 | 10/1975 | Le Rouax | 251/1 B |

FOREIGN PATENT DOCUMENTS

| | | | |
|---|---|---|---|
| 477457 | 12/1937 | United Kingdom | 277/31 |
| 1014460 | 12/1965 | United Kingdom | 251/1 B |

*Primary Examiner*—Robert S. Ward, Jr.
*Attorney, Agent, or Firm*—Marcus L. Bates

[57] ABSTRACT

A rotating blowout preventor having a special stripper rubber with reinforcement means incorporated therein in indexed relationship with a kelly drive bushing so that when the kelly is telescopingly received through the rotating blowout preventor, the corners of the kelly drivingly engage both the kelly drive bushing and stripper rubber in indexed relationship therewith. The stripper rubber is provided with spaced-apart reinforcing fingers which sealingly engage the sidewalls of the kelly in an improved manner. The reinforcing fingers are arranged respective to one another to receive the corners of the kelly midway therebetween, so that the kelly outwardly deforms the resilient stripper rubber substantially more at the area which receives the kelly corners as compared to the location of the reinforcing fingers. This geometrical configuration and arrangement of the kelly, kelly drive bushing, and improved stripper rubber greatly increases the life of the stripper rubber as well as providing improved sealing characteristics between the rotating, slidable kelly and the stripper rubber.

18 Claims, 9 Drawing Figures

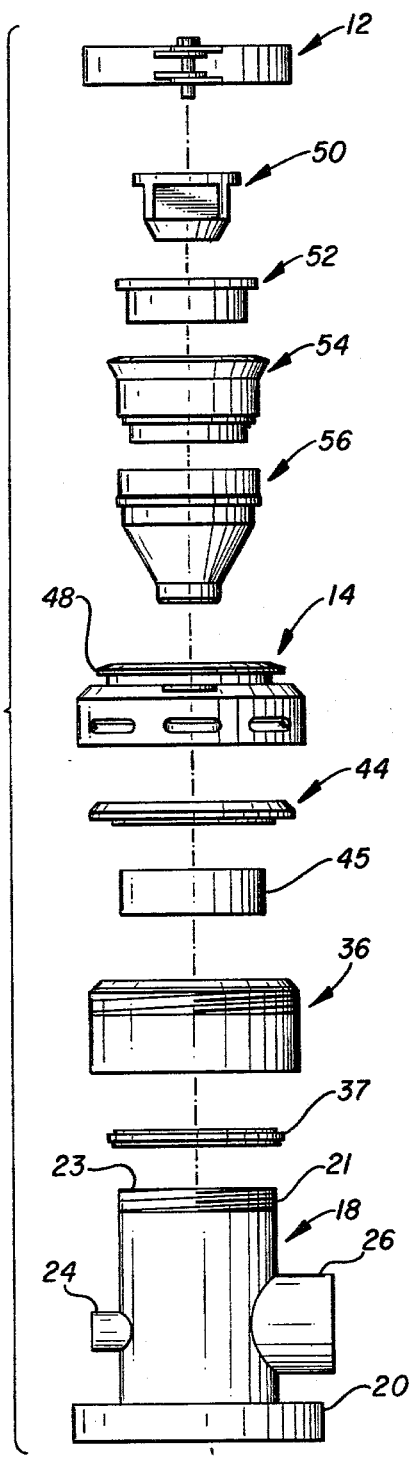
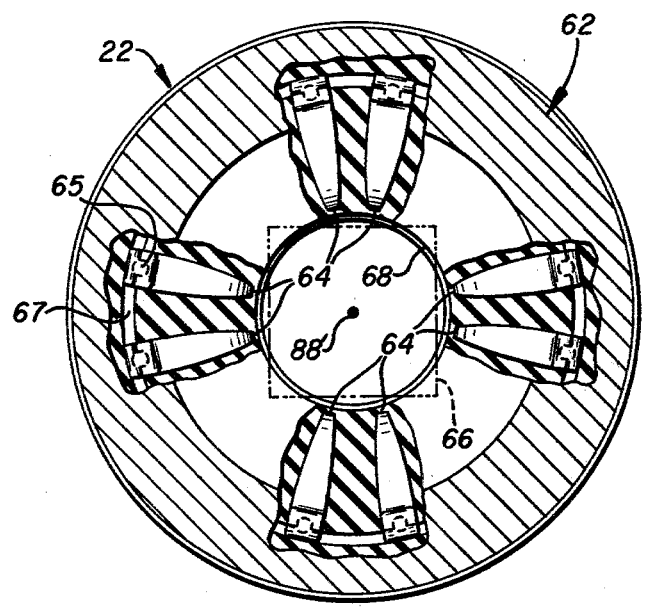

ROTATING BLOWOUT PREVENTOR WITH INDEX KELLY DRIVE BUSHING AND STRIPPER RUBBER

RELATED PATENT APPLICATION

This patent application is a continuation-in-part of my previously filed patent application Ser. No. 843,291; filed Oct. 18, 1977; now U.S. Pat. No. 4,154,448; issued May 15, 1979.

BACKGROUND OF THE INVENTION

In the drilling of boreholes, it is necessary to include a rotating blowout preventor at the upper end of the surface casing. The rotating blowout preventor sealingly receives the kelly in a slidable manner so that the kelly can support and drive the drill string while at the same time fluid is conveyed downhole to the drill bit, back up through the borehole annulus, and back out of the rotating blowout preventor. In the event a pay zone is encountered, the rotating blowout preventor restrains the increased pressures and maintains the borehole under control, thereby precluding a "blowout" occurring.

In the drilling of boreholes, it is not unusual for the stripper rubber of the rotating blowout preventor to become worn and require replacement several times during the formation of a single borehole. It would be advantageous to be able to provide a rotating blowout preventor fabricated in such a manner that it could endure for the interval of time required in making one complete borehole.

In my previous patent application Ser. No. 843,291; filed Oct. 18, 1977; now U.S. Pat. No. 4,154,448; issued May 15, 1979, there is set forth a rotating blowout preventor having an improved stripper rubber which is reinforced in such a manner that the stripper rubber engages the kelly with sufficient force to enable the stripper to rotate the rotating components of the rotating blowout preventor.

In many instances, it is desirable to alleviate the rotational load or torque imparted by the kelly into the stripper rubber by the provision of a kelly drive bushing which slidably receives the kelly to cause the edges of the kelly to engage and drive the rotating components of the rotating blowout preventor, thereby reducing the torque imparted into the rubber. When a kelly drive bushing is incorporated into the rotating blowout preventor of the present invention, it is necessary to index the reinforcing fingers of the stripper rubber with the kelly drive bushing so that as the kelly is received through the axial passageway of the rotating blowout preventor, the corners of the kelly simultaneously engage both the kelly drive bushing and the elastomer of the stripper rubber such that the corners of the kelly are simultaneously positioned at the appropriate location on both the kelly drive bushing and the stripper rubber. Such an improvement in a rotating blowout preventor provides unusually good sealing characteristics of the stripper rubber respective to the kelly as well as greatly elongating the life of the stripper rubber.

SUMMARY OF THE INVENTION

A rotating blowout preventor for use in conjunction with a cased borehole while carrying out borehole forming operations, wherein the rotating blowout preventor has a main body attachable to the upper terminal end of the cased borehole and slidably receives the rotating kelly in a sealed manner therethrough.

The rotating blowout preventor includes an external bearing housing which rotatably supports a stripper rubber mount means in low friction relationship respective to the main body of the rotating blowout preventor. A kelly drive bushing is attached to the stripper rubber mount means and engages the rotating kelly in such a manner that a rotational force is imparted between the kelly and the rotating parts of the rotating blowout preventor.

A stripper rubber, made in accordance with the present invention, is removably attached to the stripper rubber mount. The stripper rubber includes spaced reinforcing fingers radially disposed about the central passageway thereof. The spaced fingers are imbeded within the elastomeric material of the stripper rubber, and include a free end which extend toward the central passageway and a hinged end affixed to an annular flange, so that when the stripper rubber is deformed by the kelly being forced through the central passageway thereof, the sidewalls of the kelly are placed in close proximity to the reinforcing fingers, while the corners of the kelly deform the resilient material of the rubber which is located between adjacent fingers.

In order to achieve the proper relationship between the kelly, the kelly drive bushing, and the stripper rubber, it is necessary that the stripper rubber be mounted to the stripper rubber mount means and that the kelly drive bushing be mounted to drive the rotating parts of the rotating blowout preventor such that the corners of the kelly are properly indexed with both the stripper rubber and the kelly drive bushing.

Accordingly, a primary object of the present invention is the provision of improvements in a rotating blowout preventor which attains an unusually effective seal across the stripper rubber thereof.

Another object of the present invention is the provision of improvements in a stripper rubber for a rotating blowout preventor.

Still another object of the present invention is the provision of a rotating blowout preventor having a stripper rubber affixed to a rotatable stripper rubber mount means, and a kelly drive bushing which is indexed with the stripper rubber in such a manner that the kelly is always received in the same oriented manner with respect to the stripper rubber.

A further object of this invention is the provision of improvements in a rotating blowout preventor by the provision of an external bearing housing associated with a kelly drive bushing and stripper rubber which enables the stripper rubber to be removed from the main body of the apparatus without disassembly of the bearing components, and which additionally enables a kelly to be received through the drive bushing and stripper rubber in indexed relationship therewith.

A still further object of this invention is the combination of a stripper rubber, stripper rubber mount means, and kelly drive bushing for a rotating blowout preventor which receives a kelly therethrough in indexed relationship therewith.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 8 is an exploded view of the apparatus disclosed in FIG. 1; and,

FIG. 9 is a cross-sectional view of the rotating blowout preventor seen in FIG. 3, with some parts being removed therefrom in order to better disclose an important feature of the present invention.

DETAILED DESCRIPTION OF THE PREFERRED EMBODIMENT

Figure 1:
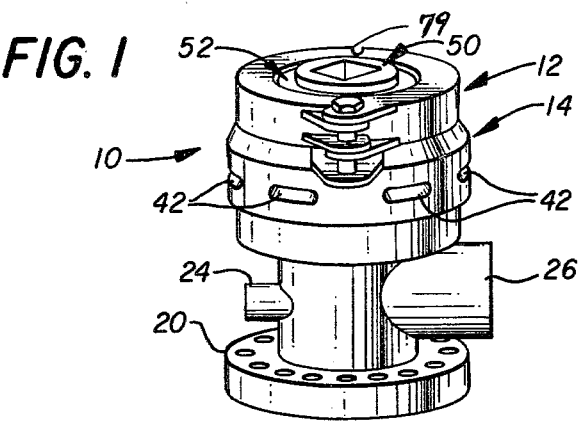
FIG. 1 is a side elevational view of a rotating blowout preventor made in accordance with the present invention.
Figure 2:
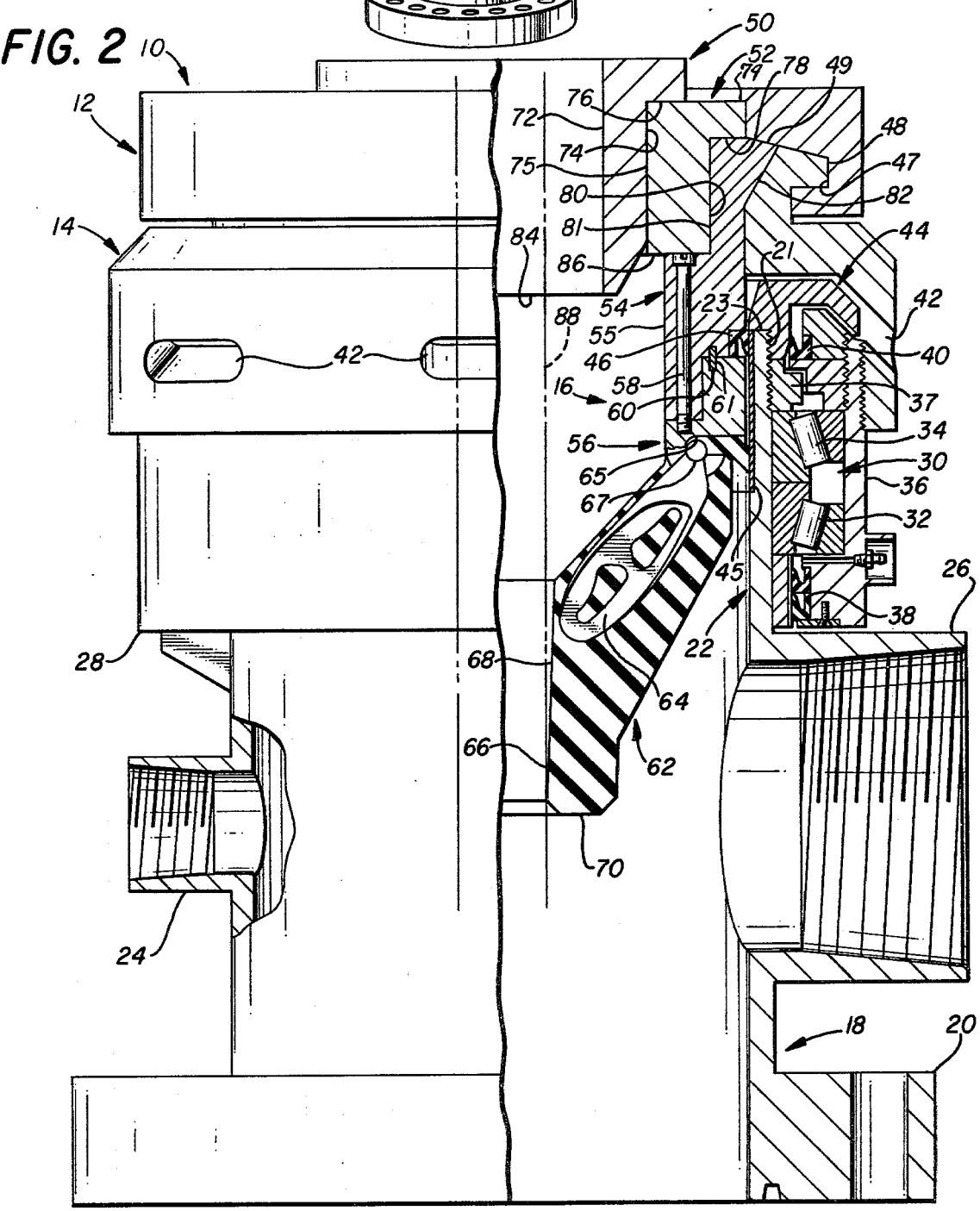
FIG. 2 is an enlarged, part cross-sectional, side elevational view illustrating other details of the rotating blowout preventor seen disclosed in FIG. 1.

In FIGS. 1 and 2, there is disclosed a rotating blowout preventor of the present invention generally denoted by the arrow at numeral 10. The rotating blowout preventor, hereinafter called RBOP, includes a clamp 12 removably affixed to the upper marginal end portion of a rotating head assembly 14.

As seen in FIG. 2, along with other figures of the drawings, a stripper rubber assembly 16 is affixed to, rotates with, and forms part of the rotating head assembly. The stripper rubber assembly forms a sub-combination of this invention.

The RBOP includes a main stationary body member 18 which terminates in a circumferentially extending flange 20 at the lowermost end thereof. Threads 21 are formed externally of a fixed washpipe 22 which is an integral part of the main body member, and which terminates at 23. The main body has an auxiliary outlet 24 and a main outlet 26 which forms a fluid return from the inner-annular area of the RBOP.

Numeral 28 indicates the lowermost, circumferentially extending, external edge portion of the rotating head assembly; and which also defines the lowermost edge portion of an external bearing chamber 30. Bearings 32 and 34 permit low friction rotation between a skirt member 36 and the fixed washpipe 22. Keeper 37 bears against the bearing races and maintains the inner-races in fixed relationship respective to the washpipe. A lower grease seal 38 is interposed between the fixed and rotating members of the rotating head assembly. Seal 40 is formed at the upper end of the bearing chamber. Radial ports 42 are placed in communication with the spaced annular areas formed above and below a ramada 44, with the ramada 44 also serving as a slinger ring. Replaceable sleeve 45 is received within and forms part of the upper marginal end of the washpipe, thereby providing a replaceable wear surface. Seal 46 prevents flow from the inner, annular area towards the radial ports. The annular areas separated by the ramada form an annular flow passageway from seal means 40 and 46 to the radial ports 42.

The upper end of the skirt terminates in an outwardly directed, circumferentially extending flange member 48 which is received within a corresponding groove 47 of the before mentioned clamp. The upper end 49 of the stripper rubber mount 54, also called a doughnut, is received within part of the clamp assembly, and within the upper marginal end of the skirt member at 82.

A kelly drive bushing 50 is concentrically arranged in indexed relationship respective to an adapter 52. The bushing 50 and adapter 52 are affixed to the rotating stripper mount assembly 54, and presents a circumferentially extending inner sidewall 55 which forms part of the axial passageway through the RBOP.

A stripper adapter bolt flange 56 is rigidly affixed in indexed relationship to the rotating doughnut 54 by means of the radially spaced-apart bolts 58 which extend through the doughnut where the lower terminal ends thereof threadedly engage the flange member 56. Pin 60 is affixed to the doughnut and extends into cavity 61 of the bolt flange so that the doughnut and flange are always indexed with respect to one another.

As seen in FIGS. 2 and 9, the stripper rubber 62 includes a plurality of spaced-apart fingers 64 having a hinged end received within cavity 65 of the bolt flange 56. The stripper includes an especially designed axial passageway which is of an oblated square configuration at 66 and a round or circular configuration at 68, although this relationship between 66 and 68 can be reversed, if desired, while remaining within the comprehension of this invention. The stripper rubber terminates at the lowermost end 70 thereof.

The kelly drive bushing has an axial passageway 72 made into the necessary configuration to receive the kelly therethrough. For purposes of illustration, the kelly and kelly drive bushing of this preferred embodiment are shown to be in square or four-sided configurations, although it is understood that the kelly and kelly drive bushing, along with the marginal passageway 66 formed through the rubber, can be of other geometrical configurations, as for example, a six-sided oblated configuration depending upon the cross-sectional geometry of the kelly.

As seen in FIGS. 2, 3, 4, and 8, the kelly drive bushing 50 includes a circumferentially extending flange at the upper end thereof which is reduced in outside dimension at 74 to form a drive means which is slidably received by the adapter member 52. The lower face of the flange 50 abuts the adapter at 76, while the outwardly extending flange 52 of the adapter has a lower face 78 which engages the upper face of the doughnut. The outwardly extending flange 52 includes an outwardly directed lug at 79 which is received within the gap formed between the adjacent ends of the clamp at the clamp opening located opposite to the clamp hinges.

The outer surface 80 of the kelly drive bushing adapter is square in configuration and is received by a complimentary female cavity 81 formed in the upper marginal end of the doughnut, thereby providing a drive means between the adapter and the doughnut. The upper outer marginal end of the doughnut enlarges at 82, thereby providing a tapered fit between the upper marginal end of the rotating skirt member and the outer peripheral surface of the doughnut. The lower terminal end 84 of the kelly drive bushing preferably extends below the lower terminal end 86 of the bushing adapter.

Numeral 88 schematically illustrates the kelly or drive member which extends down through the axial passageway formed by the RBOP. Numeral 88' is the longitudinal axial center line of the axial passageway which extends through the RBOP.

Figure 3:
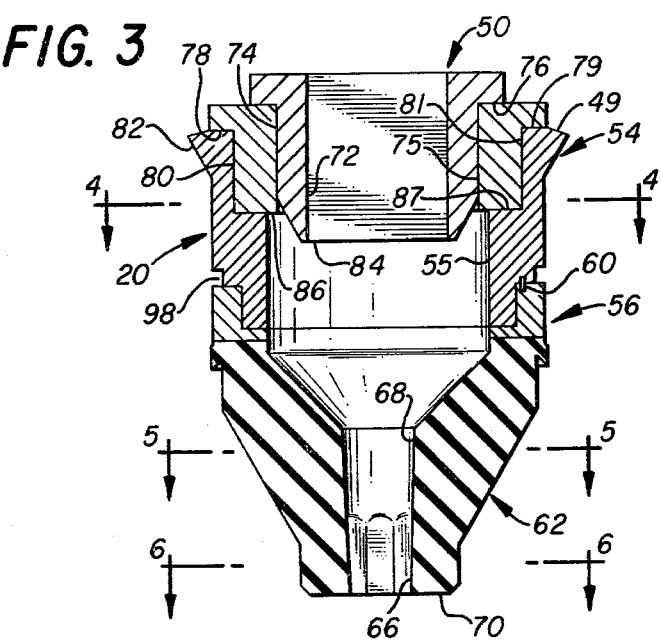
FIG. 3 is a part diagrammatical, cross-sectional illustration of the rotating blowout preventor seen in FIG. 1.
Figure 6:
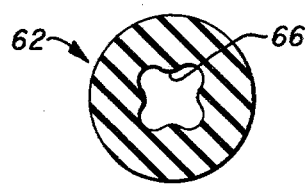
FIG. 6 is a cross-sectional representation taken along line 6—6 of FIG. 3.
Figure 7:
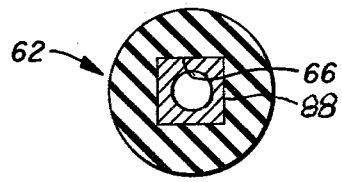
FIG. 7 is a cross-sectional representation of the stripper rubber seen in FIG. 6, and shown in the operative configuration.
Figure 5:
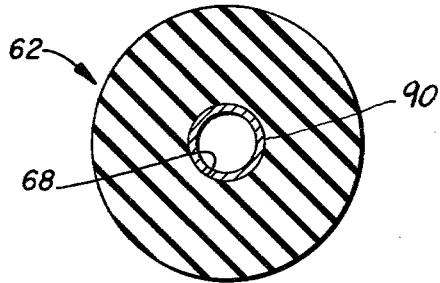
FIG. 5 is a cross-sectional representation taken along line 5—5 of FIG. 3.

As seen illustrated in various ones of the figures of the drawings, as the kelly is forced down through the axial passageway of the RBOP, the kelly engages the kelly drive bushing 50 and simultaneously deforms the stripper rubber from the configuration seen in FIGS. 3 and 6 into the configuration seen illustrated in FIG. 7. This causes the stripper rubber to sealingly engage the outside surface of the kelly thereby procluding flow of fluid from the lower annulus, across the rubber, and into the upper annulus. Accordingly, fluid flows down through the axial passageway of the kelly, down through the drill string to the drill bit, back up through the borehole annulus, and into the lower annulus of the RBOP, whereupon the fluid must exit the main passageway 26 and flow to the mud pit (not shown).

Figure 4:
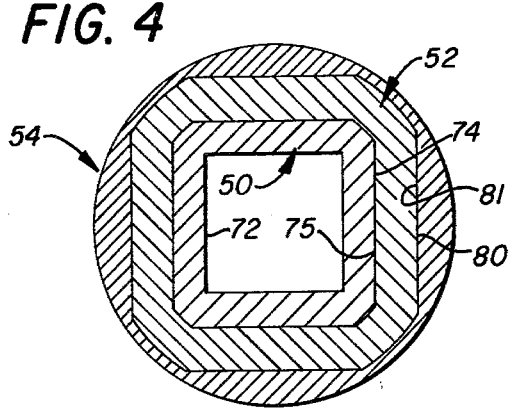
FIG. 4 is a cross-sectional view taken along line 4—4 of FIG. 3.

The kelly drive bushing is preferably made into the square configuration seen illustrated in FIGS. 4 and 8, and is received by the complimentary configured adapter 52. The adapter also is of a square configuration and is received within a complimentary configurated female cavity 81 of the doughnut. Accordingly, regardless of the mating of the square kelly drive bushing and adapter, these two members are always properly arranged respective to one another and to the doughnut with the four sides of the kelly being orientated with the corners thereof extending radially in the same direction due to the symmetry of the coacting surfaces of these members.

The stripper rubber, however, must be orientated respective to the corners of the kelly in the manner illustrated by FIG. 9. That is, the spaced pairs of fingers must engage the opposed four flat wall surfaces of the kelly in order for the corners of the kelly to be received in the intervening area between the four pairs of fingers. For this reason, an indexing pin 60 is arranged to engage the doughnut and the stripper rubber adapter so that the stripper rubber and adapter therefor are always mated with the doughnut such that the kelly is received through the stripper rubber in the illustrated manner of FIG. 9.

It is advantageous to fabricate the passageway through the stripper rubber such that a marginal length thereof conforms generally with the geometry of the kelly, and another marginal length thereof is made round so as to sealingly engage the round tubing string in a superior manner. This important aspect of the invention allows the stripper rubber to sealingly engage the rectangular kelly as well as the round drill pipe string.

The area 66 of the passageway through the stripper rubber preferably is made into a generally rectangular configuration having rounded corners with the intervening area there between being extended slightly inwardly to form a four-leaf clover in the illustrated manner of FIGS. 3 and 6. This geometrical configuration of the passageway through the stripper rubber enables the stripper rubber to be deformed in the manner of FIG. 7 with reduced rubber fatigue. By fabricating the passageway into this configuration during the vulcanization thereof, reduced cracking and spliting of the stripper rubber is achieved as the kelly forcibly slides therethrough.

The provision of spaced pairs of fingers in the illustrated manner of FIG. 9, and the indexing of the kelly drive bushing such that the corners of the kelly are received therewithin in the manner of FIG. 9, imparts the stripper rubber with reinforcement at critical areas causing greater life expectancy to be achieved therefrom.

As the kelly is rotated by the turntable of the drilling rig, the kelly drive bushing imparts rotational motion into the bushing adapter, and then into the doughnut. At the same time, the kelly distends the resilient material of the stripper rubber radially outwardly with the greatest deformation occurring in the area which is devoid of reinforcement. This arrangement of the kelly respective to the stripper rubber and fingers thereof, together with the clover-leaf central passageway greatly increases the sealing power effected between the stripper rubber and the kelly so that flow of fluid through the intervening area between the kelly and the axial passageway of the rubber is procluded.

I claim:

1. A rotating blowout preventor having a main body, a longitudinal extending axial passageway formed therethrough through which a driving member, such as a kelly, can be received; said main body includes an inner fixed sleeve;

a rotatable stripper assembly which includes a stripper rubber for sealingly receiving a longitudinally extending driving member in axial slidable relationship therewith; a stripper mount body to which said stripper rubber is affixed, the lower marginal end of said stripper assembly being rotatably received within the upper marginal end of said main body, a seal means located between said stripper mount body and said inner fixed sleeve for precluding flow of drilling fluid thereacross;

a rotatable, load carrying, outer skirt member axially aligned with said axial passageway and spaced outwardly from said inner fixed sleeve, and having the upper end thereof removably affixed to said stripper mount body to form a bearing housing therebetween, an upper and a lower bearing means axially aligned with one another and with said axial passageway and transferring a load from said load carrying, outer skirt member into said inner fixed sleeve; upper and lower seal means located within the opposed ends of said bearing housing at a location above said upper and below said lower bearing means to isolate the bearing housing from contamination;

drive means associated with said stripper assembly for enabling a driving member to impart rotational motion thereinto which causes said load carrying, outer skirt member to rotate while the load carrying, outer skirt member is rotatably supported by said upper and lower bearing means;

said stripper rubber includes radially spaced reinforcement means arranged to engage the faces of a driving member, so that the corners between the faces of the driving member can be received in the intervening area between the reinforcement means;

and means by which the drive means is indexed with respect to the stripper rubber so that the corners of a driving member are received in said intervening area.

2. The rotating blowout preventor of claim 1 wherein said drive means associated with said stripper assembly includes a kelly drive bushing means by which rotation is imparted into said outer skirt member by a driving member;

whereupon said kelly drive bushing means is indexed with said reinforcement means so that the corners of the driving member are received in the recited intervening area.

3. The rotating blowout preventor of claim 1 wherein said rotatable, load carrying skirt member includes a circumferentially extending flange member at the upper end thereof, which downwardly depends in concentric relationship respective to said inner fixed sleeve and thereby forms a downwardly opening chamber which is said bearing housing;

a slinger ring affixed to said inner fixed skirt and having a circumferentially extending edge portion outwardly extending into overlying relationship respective to part of said outer skirt member to form an annular chamber;

radial ports formed in said outer skirt member which communicate with an annular area formed between said flange and said slinger ring so that any fluid which inadvertently leaks through said stripper seal will be conducted along said annular area and out of said radial port.

4. The apparatus of claim 3 whrein said outer skirt includes a separate, lower marginal free end portion in the form of a cylinder which threadedly engages the upper marginal end of said outer skirt;

said slinger ring has an inner threaded portion which threadedly engages said inner fixed sleeve;

so that when said rubber stripper assembly is rotated respective to said cylinder, the upper end of the outer rotating member is unscrewed and the upper end of the outer rotating member can be lifted along with the stripper assembly and clamp.

5. The rotating blowout preventor of claim 1 wherein an abutment is formed on the upper marginal end of said seal and bearing housing against which the outer race of said upper bearing is received, an annular groove formed in said abutment for receiving said upper seal therein;

said load carrying skirt member includes a circumferentially extending flange member at the upper end thereof, said load carrying skirt and said inner fixed sleeve are spaced apart and thereby form a downwardly opening chamber which is said bearing and seal housing;

a slinger ring affixed to said inner fixed skirt and having a circumferentially extending edge portion outwardly extending into overlying relationship respective to said outer skirt member to form an annular chamber; and, radial ports formed in said outer skirt member which communicate with the annular area formed between said flange and said slinger ring so that any fluid which inadvertently leaks through said stripper seal and said upper seal will be conducted out of said radial port.

6. The rotating blowout preventor of claim 1 wherein said stripper mount body includes an outwardly directed groove formed about the outer peripheral surface thereof, a groove formed in said load carrying, outer skirt member and spaced from and concentric with the first said groove, a clamp means having an inside surface made complementary with the before recited spaced, concentric grooves so that the clamp means affixes said stripper mount body to said outer skirt member;

whereupon, said clamp can be removed from attached relationship respective to said stripper mount body and said load carrying, outer skirt member so that the stripper assembly can be lifted free of said outer skirt member.

7. The rotating blowout preventor of claim 2 wherein said stripper rubber is affixed to a stripper bolt flange, said reinforcement means includes a hinge element formed on a lower end portion of said bolt flange; and, a plurality of elongated fingers having a hinged end and a lower end spaced therefrom, said hinged end being hingedly affixed to said hinge element such that the fingers are each pivotally affixed to said bolt flange in radially spaced relationship respective to one another and to said axial passageway;

said fingers being circumferentially spaced apart from one another and arranged respective to one another so that a kelly having a cross-section in the form of a polygon will present the corners thereof into the area of the rubber at a location between the spaced apart fingers to thereby deform the stripper rubber at the intervening area between said fingers.

8. The rotating blowout preventor of claim 1 wherein said stripper rubber is an assembly which includes a stripper flange member by which the stripper rubber is removably mounted to said lower end of said rotatable stripper assembly;

said reinforcement means being a plurality of spaced, elongated, metal members having a hinge end and a pivot end, means pivotally mounting said hinge end of said metal members to said stripper flange such that the metal members can transfer torque into said stripper flange, and the pivoted end of the metal members extend downwardly and inwardly towards one another and concentrically respective to said axial passageway;

said metal members being vulcanized within said stripper rubber; the circumferential spacing of the metal members being such that the corners of a kelly are forcibly received therebetween to aid in transmitting torque from the kelly into the stripper rubber assembly; and means connected to said rotatable stripper assembly by which the corners of a kelly are caused to be oriented respective to the rubber to cause the kelly corners to be received within the intervening area between the metal members.

9. The rotating blowout preventor of claim 1 wherein a marginal length of the axial passageway formed through the rubber includes a first configuration and a second configuration;

said first configuration generally conforming to the configuration of the driving member while the second configuration is circular for sealingly engaging a cylindrical tubing string.

10. The rotating blowout preventor of claim 9 wherein said driving member is a kelly of square configuration while said first configuration is in the form of a clover leaf.

11. A rotating blowout preventor having a main body member, a rotating head assembly, and an external bearing chamber having bearings isolated therein which rotatably support said head assembly;

said rotating head assembly includes a stripper assembly which is removably received therewithin, and a downwardly depending skirt member;

said main body member includes an upwardly extending fixed washpipe which supports said bearing housing externally thereof, and which receives said stripper assembly therewithin; seal means formed between said washpipe and said stripper assembly to preclude fluid flow uphole therethrough;

an outflow pipe formed in said main housing in underlying relationship respective to said stripper assembly and arranged for flow to occur laterally therefrom;

the walls of said bearing housing being the outside wall of said washpipe and the inside wall of said skirt member; upper and lower seal means, respectively, closing the upper and lower ends, respectively, of said bearing chamber;

said stripper rubber includes radially spaced reinforcement means arranged to engage the faces of a kelly, so that the corners of a kelly can be received in the intervening area between the reinforcement means;

and means by which the kelly corners are indexed with respect to the stripper rubber so that when the kelly is telescopingly received within the rotating blowout preventor, the corners of the kelly are received in said intervening area.

12. The rotating blowout preventor of claim 11 wherein said rotatable stripper assembly includes a kelly drive bushing means by which rotation is imparted into said outer skirt member by a kelly driving member;

said means by which the kelly corners are indexed arranges said kelly drive bushing in indexed relationship with said reinforcement means so that the corners of the kelly are received in the recited intervening area.

13. The rotating blowout preventor of claim 11 wherein said stripper rubber has an axial passageway formed therethrough which includes a marginal length of a first configuration and a marginal length of a second configuration;

said first configuration generally conforming to the configuration of the driving member while the second configuration is circular for sealingly engaging a cylindrical tubing string.

14. The rotating blowout preventor of claim 13 wherein said driving member is a kelly of square configuration while said first configuration is in the form of a clover leaf.

15. The rotating blowout preventor of claim 11 wherein said stripper rubber is an assembly which includes a stripper flange member by which the stripper rubber is removably mounted to said lower end of said rotatable stripper assembly;

said stripper rubber includes a plurality of spaced, elongated, metal reinforcements having a hinge end and a pivot end, means pivotally mounting said hinged end of said metal reinforcements to said stripper flange such that the metal reinforcements can transfer torque into said stripper flange and the pivoted end of the metal reinforcements extend downwardly and inwardly towards one another and concentrically respective to said axial passageway;

said metal reinforcements being vulcanized within said stripper rubber; the circumferential spacing of the metal reinforcings being such that the corners of a kelly are forcibly received therebetween to transmit torque from the kelly into the stripper rubber assembly.

16. An RBOP having a main body member by which it can be attached to the upper end of a cased wellbore; a rotating head assembly rotatably supported by said main body member, a stripper rubber attached to the lower end of said rotating head assembly and forming an annulus between said rotating head assembly and said main body member; said main body member, said rotating head assembly, and said stripper rubber being axially aligned with respect to one another with said stripper rubber being adapted to sealingly engage a driving member which slidably extends therethrough; an outlet formed in said main body member at a location which enables flow to occur from the annulus about said stripper rubber laterally away from said main body member;

drive means included in said rotating head assembly by which a driving member transfers torque into said rotating head assembly and thereby rotates said stripper rubber;

said stripper rubber includes radially spaced reinforcement means arranged to engage the faces of a kelly, so that the corners of a kelly can be received in the intervening area between the reinforcement means;

and means by which the kelly corners are indexed with respect to the drive means and stripper rubber so that the corners of the kelly are received in said intervening area.

17. The RBOP of claim 16 wherein said reinforcement means in said stripper rubber is a plurality of spaced, elongated, metal reinforcements having a hinged end and a pivoted end; means mounting said hinged end of said metal reinforcements to a stripper flange such that the metal reinforcements can transfer torque into said stripper flange and the pivoted end of said metal reinforcements extend downwardly and inwardly towards one another and concentrically respective to the axial passageway thereof;

said metal reinforcements being vulcanized within said stripper rubber; the circumferential spacing of said metal reinforcings being such that when the corners which define the ends of adjacent sidewalls of a kelly are forcibly received therebetween, torque from the kelly is transferred into the stripper rubber assembly, thereby imparting a rotational motion into the stripper assembly;

and means connected to said rotating head assembly for orientating the corners of a kelly with the area between said metal reinforcements.

18. The rotating blowout preventor of claim 16 wherein a kelly drive bushing means is connected to enable said drive means to rotatably drive said rotating head assembly;

said means by which the kelly corners are indexed include means orienting said bushing means with said stripper rubber to cause the kelly corners to be oriented at a location between adjacent ones of said metal reinforcements.

* * * * *